J. A. WINTROATH
BEARING.
APPLICATION FILED AUG. 30, 1916.

1,268,906.

Patented June 11, 1918.

Inventor:—
John A. Wintroath
By Robert O. Phelps
His Attorney.

UNITED STATES PATENT OFFICE.

JOHN A. WINTROATH, OF LOS ANGELES, CALIFORNIA, ASSIGNOR TO LAYNE & BOWLER CORPORATION, OF LOS ANGELES, CALIFORNIA, A CORPORATION OF CALIFORNIA.

BEARING.

1,268,906.     Specification of Letters Patent.     Patented June 11, 1918.

Application filed August 30, 1916. Serial No. 117,600.

*To all whom it may concern:*

Be it known that I, JOHN A. WINTROATH, a citizen of the United States, residing at Los Angeles, county of Los Angeles, State of California, have invented a new and useful Bearing, of which the following is a specification.

The bearing involved in this invention is applicable to high speed heavy duty shafts such as are used in deep well centrifugal pumps, in which connection it has recently gone into extensive use and has increased the range of such pumps to depths previously unattainable with pumps working on the rotary or centrifugal principle.

One of the objects of the invention is to improve the means for packing the fluid operated bearing, which is one of the elements of my larger bearing system, and it will of course be understood that the problem of packing such a member is important from the standpoint of the efficiency of the system. Also, this problem is difficult in view of the high speed of the shaft and the deflections and vibrations to which it is subject. This specification will disclose my solution thereof.

Other objects will appear from a consideration of the drawings and the specification.

The drawings illustrate some of the preferred forms of the invention.

Figure 1:
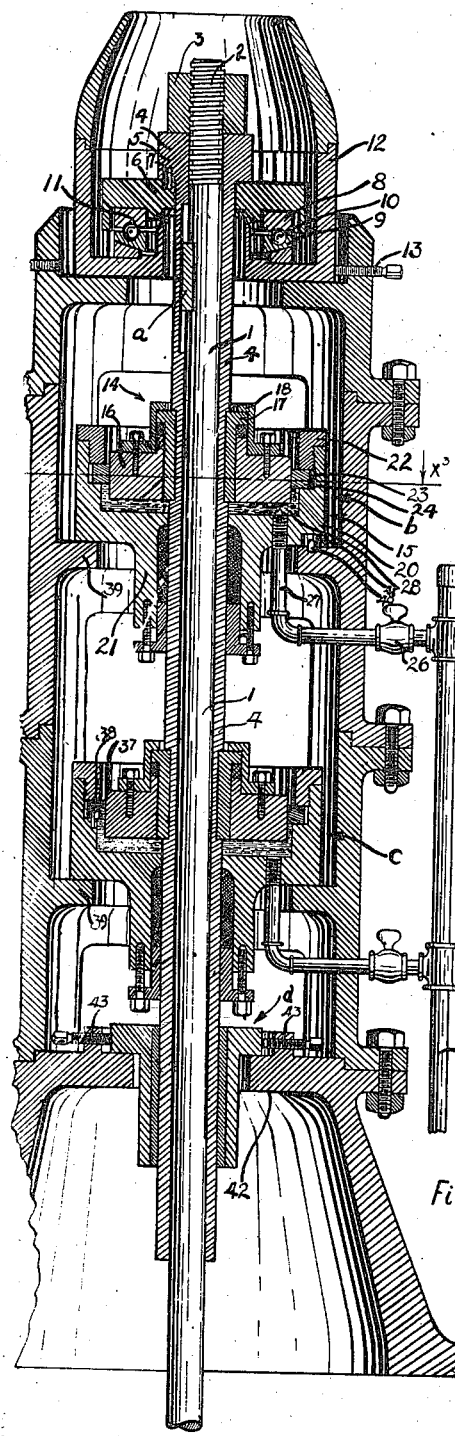
Figure 2:
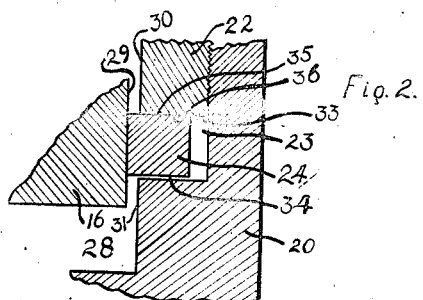
Figure 3:
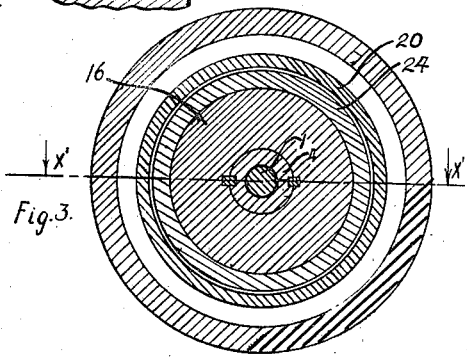
Figure 4:
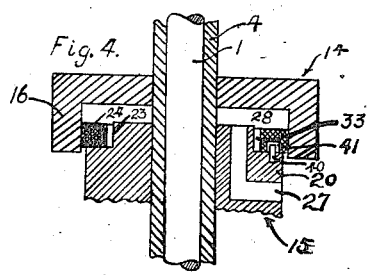
Figure 5:
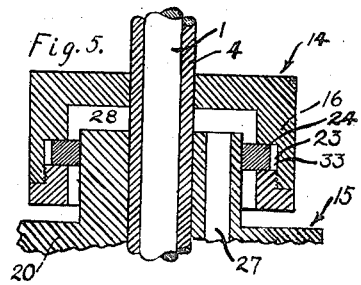

Figure 1 is a longitudinal section through my bearing or bearing system. Fig. 2 is an enlargement of certain features thereof. Fig. 3 is a transverse section on line $X^3$—$X^3$, Fig. 1. Fig. 4 illustrates one modification of the packing feature, and Fig. 5 illustrates another modification thereof.

For the purposes of this invention shaft 1 may be considered as supporting a very heavy thrust, say several tons in a downward direction, and as having a high rotary speed, say 1,000 revolutions per minute, or more. In a general way these are the conditions encountered in deep well centrifugal pumps.

The bearing system for handling this thrust is located at the top of the ground, and from this point the shaft extends down several hundred feet into the well and works the pumping parts which are fastened to its lower end. The heavy thrust is composed of the weight of the shaft, the reaction of the rising column of water, which is particularly noticeable with some styles of pumps, and the weight of the impellers and other parts at the lower end of the shaft.

The top threaded end 2 of the shaft, see Fig. 1, engages nut 3, and if preferred the shaft may be housed in a sleeve 4 extending from below nut 3 down through the bearings as shown. This sleeve fits the shaft nicely and key "*a*" causes the sleeve and shaft to rotate together, but they are free to slide lengthwise on each other.

The head 5 of the sleeve 4 rests on plate 6 to which it is pinned by pin 7. Wear ring 8 is forced onto plate 6 and revolves with it. Also, between ring 8 and the corresponding ring 9 below, are the antifriction ball bearings 10, which are arranged in the ordinary manner in the annular groove 11 encircling the shaft. These balls support part of the load of the shaft as will be hereinafter explained.

The housing 12 which supports this antifriction bearing means is adjustable laterally so that it may accommodate itself to the shaft, and the adjustment is effected by means of screws 13.

In addition to the support thus given the shaft receives most of its support from one or more fluid operated bearings. In Fig. 1 two of these bearings are shown, the upper one being indicated at "*b*," and the lower one at "*c*," and since these bearings are practically duplicates of each other the description of one will also serve for the other.

In a general way these bearings consist of a rotary portion 14, connected to shaft 1 or sleeve 4, and a stationary portion 15.

The rotary portion includes the plate or piston 16 which is keyed to the shaft by means of keys 17. These keys are guarded above by cap 18, and are butted below by ring 19 fitting between the head of the key and the neck of the piston.

The stationary member consists of the base portion 20 having a stuffing box 21 below, and a ring or cap 22 screwed in above. The construction of this base and cap is such that when they are put together as shown, an accurately machined annular socket 23 is formed between them, and in this socket is housed the full floating endless ring 24.

Before going further into the details of construction, it will be understood that some suitable fluid like oil or water is forced into pipe 25 from a pump of adequate pressure and capacity, and from this pipe the fluid passes through the regulating valve 26, and pipe 27, into pressure chamber 28. The pressure of the fluid is of course very high, sometimes being in excess of 100 pounds per square inch, and if efficiently confined within chamber 28, it exerts a tremendous upward thrust on piston 16 and counterbalances and supports most of the down thrust of the shaft. Of course the degree in which this bearing can be depended upon to uniformly support these heavy thrusts, over long periods of time, and without watching, depends entirely upon the efficiency with which the fluid is confined within chamber 28 without leakage, and in view of the high rotary speed of the shaft, and its deflections, and adjustments, the problem of eliminating or minimizing the leakage is naturally very difficult.

The difficulty in fact was one of the causes that delayed the early commercialization of these bearings, but the full floating endless ring 24, subject to the qualifications and suggestions. as to the machining of the surrounding members, etc., as herein set forth, has eliminated these difficulties, and has recently raised the bearings herein shown to so high a standard, that this system has practically gone into universal application in high duty centrifugal well pumps. This in fact was quite a notable achievement because the difficulties referred to acted as a practical limitation against the extension of such pumps to very deep and heavy work, but this invention, by eliminating the trouble, has destroyed this limitation and already these pumps have reached a depth of more than twice what was usual before the introduction of this invention.

In order to understand all this more fully, attention is called to Fig. 1, and to enlarged Fig. 2.

The outer cylindrical surface 29 of plate or piston 16, is machined and finished very accurately, and substantial clearance, sometimes an eighth of an inch, is left between this surface and the inner surface 30 of cap 22, and surface 31 of base 20, see Fig. 2. In fact I prefer that this surface 29 should be in active contact with no other surface except the inner surface of the ring 24, but this surface of the ring, is machined very accurately so as to exactly fit the equally well finished surface 29 of the piston, without permitting any appreciable leakage between these surfaces, and on the other hand without causing any binding between the ring and the piston. This fit should be as accurate as possible, and in practice I sometimes work it. to within a fraction of a thousandth of an inch, still leaving the ring free however to rotate or move lengthwise on the piston or plate 16. Of course with such a fit the leakage is greatly minimized, but the great point is to maintain this fit without noticeable wear during normal operation. Ordinarily it would be presumed that the minute vibrations of the shaft would cause plate 16 to press hard against ring 24, first on one side and then on the other, thus wearing it out all around until the leakage therethrough would be very great. All this would happen to be sure if the ring were held rigidly in position so that the entire lateral thrust of the shaft came against it; but I eliminate the wear, and therefore the resulting leakage, by preventing the shaft from pressing on the ring with any noticeable force no matter how bad the vibration of the shaft or other parts. It is toward this that the full floating feature of my ring is directed. By being full floating I mean that the ring has ample clearance both laterally and vertically, and is therefore free to float in any direction with the shaft and the plate or piston. This will be clear from Fig. 2, where the clearance 33 at the back of the ring indicates the range of lateral freedom and the clearance 34 at the bottom of the ring indicates the range of vertical freedom. The bottom surface 35 of cap 22, and the upper surface 36 of ring 24, are also machined accurately so that when the fluid works up from chamber 28 into clearance 34 beneath the ring it forces face 36 of the ring up onto face 35 of the cap and seals off all possible leakage around the ring that way, the same as surfaces 29 and 30 seal off leakage at that point. Between these various joints, and the stuffing box 21, the chamber 28 is obviously closed throughout so that fluid pumped into it maintains practically its initial pressure and exerts a very vigorous and constant upward force on the plate 16. Also, it will be understood that the ring 24 is restrained against rotation by means of pin 37, reaching into the enlarged cavity 38 in the ring, see bearing "c", Fig. 1.

With a construction finished off as indicated, the shaft may vibrate and deflect in conformity with its usual behavior but the ring will float with it freely and no noticeable pressure is ever established between the piston or the ring, or other vital parts, and all fits therefore remain practically intact as at first even after many months of continuous operation. Viewing this conversely it practically means that since the leakage is eliminated at the start no troubles from this source are subsequently encountered, and in view of the constancy and dependability thus derived from these fluid operated bearings I can safely trust them with the care and support of the several thousand dollars' worth of machinery that hangs on the shaft below. Not only is the wear on the ring reduced by its full floating feature as described, but also, since there is always a very slow oozing leakage which I prefer to permit between the ring and the piston, these faces 29 and 32 possibly never come into actual wearing contact with each other but are probably always held apart by the confined film of oil that gradually works up and through them. This leakage of which I speak is not in the ordinary copious sense, which is objectionable, but is more in the nature of a slow oozing action such as is consistent with good lubrication of the adjacent parts, and as indicated, I am of opinion that this is highly desirable and should not be eliminated.

Also, the fact that the ring is endless, as distinguished from the ordinary "split rings" used for packing purposes, is of considerable value, for if the ring were split the fluid that oozes up between it and the piston would promptly spring the split ring away from the piston, for it must be remembered that the pressure of this fluid is very high, and of course if the ring were sprung out the leakage would be very great. For this reason I use the endless ring made of some good bearing metal, or its equivalent, and also in view of the fact that the ring is endless, I make the cap 22 removable from the base 20 in order that I can put the ring in place and take it out. If the ring were split it could be sprung into its socket and out again in the ordinary manner, but this is not possible with the endless ring.

The next point that warrants consideration is the general arrangement of my bearings with respect to each other, and also the mutual adjustments between them.

From Fig. 1 it will be seen that each of the bearings "b" and "c", are supported on a ledge 39, connected with the outer housing, and also that they are free to move around laterally on the ledge except that they are ultimately limited in their motion by pin 40 reaching into the enlarged cavity 41,—see bearing "b". Also, below the lowermost fluid bearing is located the bearing "d", which is chiefly useful if the shaft is driven with a belt, and this bearing is also adjustable laterally on web or ledge 42 by means of screws 43, the same as the uppermost bearing in the system is adjustable by means of screws 13.

All these various adjustments play an important part in simplifying the machining between my bearings and in allowing them to automatically accommodate themselves to the shaft. It will be understood of course that as the shaft comes up through the earth, it is not always strictly vertical, in view of crookedness of the well, etc., and when this is true I consider it wiser to aline the bearings with the shaft rather than to force the shaft to take the line of the bearings. The latter procedure would put the shaft under stress and would also cause the bearings to wear fast.

With my system however, I adjust the top bearing and the bottom bearing "d", laterally by means of screws 13 and 43, until these bearings take up the normal line of the shaft, and in view of the bearings "a" and "b" being free to move laterally on their ledges 39, these members will of course line themselves up automatically. Clearly this is all desirable because it makes the adjustments quick and easy, and also avoids all possibility of putting the shaft under strain such as might happen if some of the bearings were absolutely rigid in their housing. If two or more of the bearings were fixed in the housing, instead of being movable and adjustable as shown, the machining of the entire housing and the seat for the bearings, as well as of the bearings themselves, would have to be so accurate that the cost would be practically prohibitive. Not only does my arrangement eliminate the cost but it also is preferable to have elasticity in the system because it is often necessary to change the alinement as the entire construction gradually adjusts itself to its operating conditions.

In addition to this elasticity in a lateral direction, my system is also possessed of a desirable degree of elasticity in the vertical direction.

By this I mean, that each of the pistons 16 in the fluid operated bearings may move up and down a considerable amount without destroying or disturbing the fluid tight feature of the pressure chamber 28. Fluid operated bearings of this construction are essentially different from other bearings in which fluid somehow coöperates in supporting the thrust, but which secure the fluid tight feature by virtue of the top plate resting and running in contact with an upstanding annular rim projecting from the base below. Such constructions are akin to ordinary thrust plates with forced feed lubrication in between, because there is no vertical elasticity to the bearing. If the top plate moved up the least bit it would destroy the seal effected at the rim and would allow the fluid to squirt out freely between the plates. This would of course render the bearing useless, at least so far as its ordinary theory of operation goes. Such inelastic bearings could not be worked into a multistage system because the machining that would be required both in the stationary housing and in the shaft parts, so as to cause the several pistons to register accurately with the tops of the upstanding rims, or with the bottom plates, if common thrust plates are used, would be so great and the character of the work so fine that the expense would be prohibitive, and also it would only be a short time before one of the bearings wore more than the others and would promptly give trouble. With my type of bearings however, there is considerable vertical play in each, and the fluid operated bearings can not only register automatically with each other regardless of the number of them which there are in series, but they can also register equally well with any supplementary bearing of a purely mechanical sort like the ball bearing at the top of the shaft, and no special machining of any character is required. Of course I use two or more of the fluid operated bearings according to the load to be carried, and with very heavy loads there should be a great many of such bearings. I do not like to use the fluid operated bearings alone without some supplementary mechanical bearing, because if I did the shaft would tend to work up and down continually. This is due to the fact that it would be very difficult to keep the fluid pressure in the bearings constant all the time, and if there were no mechanical bearing the fluctuations in fluid pressure would cause the shaft to move up and down in accordance with principles which are well understood. With the supplementary mechanical bearing present however, I arrange the fluid pressure so that the fluid operated bearings carry slightly less than the full shaft load, say 95% thereof, and the remaining 5% is carried on the supplementary mechanical bearing. This slight remainder is just sufficient to anchor the shaft on the mechanical bearing always, and prevents the vertical oscillations of the shaft referred to, so that the chief function of the mechanical bearing is to position the shaft and hold it there while the fluid operated bearings carry by far the major portion of the load.

With reference to sleeve 4 surrounding the shaft, its function will be understood to be as follows:

In order to place the impellers attached to the lower end of the shaft at the correct point in the pump bowls, it is often necessary to raise or lower the shaft slightly in position. This is done by turning nut 3 which works in conjunction with the threaded end 2 of the shaft and either raises or lowers the shaft. If the sleeve 4 were not a part of the structure, and the bearing parts were all connected direct to the shaft instead of to the sleeve, these parts would also be pulled up or down through the housing with all adjustments of the shaft, and in that event the bearing parts, particularly pistons 16 on the fluid operated bearings, would have to be very long in order to provide for this adjustment, or else the amount of the adjustment would be curtailed, and neither of these contingencies are desirable. When the sleeve is used however, the shaft draws up through the sleeve, and the bearing parts are all unconscious of the adjustment. The length of the bearing parts can remain small therefore, and the amount of such shaft adjustment is unlimited except by the length of the thread at the end.

With reference to the various parts of my construction as herein disclosed it will of course be understood that the same may be varied extensively without departing from the spirit of my invention, and this is particularly true in connection with the full floating endless ring, and accompanying parts, as hereinbefore set forth. Fig. 4 shows a modification in which the ring and its socket are placed at the top of the base portion 20 of the bearing, and Fig. 5 shows another modification in which the ring is in the rotating part instead of the stationary part of the structure. I prefer the construction shown in Fig. 1, however, but do not desire to be limited to this or any of the other modifications shown, except as distinctly stated in the appended claims.

Claims.

1. In combination, a vertical shaft threaded near its upper end, a nut engaging the said threaded portion of the shaft, a sleeve embracing the said shaft and having a sliding relation therewith, the said sleeve being connected to the shaft however so as to rotate therewith, and bearing members connected to the sleeve for supporting downthrusts transmitted from the shaft.

2. In combination, a vertical shaft threaded near its upper end, a nut engaging the said threaded portion of the shaft, a sleeve embracing the said shaft and having a sliding relation therewith, the said sleeve being connected to the shaft so as to rotate therewith, the nut having a connection with the sleeve so that by screwing the nut the shaft is drawn through the sleeve, a plurality of bearing plates rigidly locked onto the sleeve one above the other, one of said plates being associated with a mechanical bearing for sustaining part of the downthrust of the shaft, and another of said plates being associated with a fluid operated bearing for supporting another part of the downthrust of the shaft.

3. In combination, a rotating vertical shaft loaded from below, a fluid operated bearing coöperating in supporting the shaft, said fluid operated bearing including a rotary member and a stationary member, an endless packing ring between the said rotary and stationary members, and independent means for supplying fluid to the bearing.

4. In combination, a rotating vertical shaft loaded from below, a fluid operated bearing coöperating in supporting the shaft, said fluid operated bearing including a rotary member and a stationary member, a connection between the said rotary member and the shaft so as to cause the rotary member to rotate with the shaft, the said rotary and stationary members being shaped in such manner as to form a pressure chamber for receiving fluid under pressure between them, independent means for supplying fluid to the bearing, and an accurately machined endless ring for packing off the space between the rotary member and the stationary member.

5. In combination, a rotating vertical shaft loaded from below, a fluid operated bearing coöperating in supporting the shaft, said fluid operated bearing including a rotary member and a stationary member, a connection between the said rotary member and the shaft for causing the rotary member to rotate with the shaft, the said rotary and stationary members being shaped in such manner as to form a pressure chamber for receiving fluid under pressure between them, and an accurately machined endless packing ring between the rotary and stationary members, said ring having free lateral play.

6. In combination, a rotating vertical shaft loaded from below, a fluid operated bearing coöperating in supporting the shaft, said fluid operated bearing including a rotary member and a stationary member, a connection between the said rotary member and the shaft for causing the rotary member to rotate with the shaft, the said rotary and stationary members being shaped in such manner as to form a pressure chamber for receiving fluid under pressure between them, an accurately machined endless packing ring between the rotary and stationary members, said ring fitting in an annular socket in which it has free lateral play, and a removable portion forming one wall of the socket so that the endless ring can be withdrawn and placed in the socket.

7. In combination, a rotating vertical shaft loaded from below, a fluid operated bearing coöperating in supporting the shaft, said fluid operated bearing including a rotary member and a stationary member, a connection between the said rotary member and the shaft for causing the rotary member to rotate with the shaft, the said rotary and stationary members being shaped in such manner as to form a pressure chamber for receiving fluid under pressure between them, an accurately machined endless packing ring between the rotary and stationary members, said ring fitting in an annular socket in which it has free lateral play, a removable portion forming one wall of the socket so that the endless ring can be withdrawn, and means for preventing the rotation of the ring around the socket.

8. In combination, a rotating vertical shaft loaded from below, a fluid operated bearing coöperating in supporting the shaft, said fluid operated bearing including a rotary member and a stationary member, a connection between the said rotary member and the shaft for causing the rotary member to rotate with the shaft, the said rotary member having an accurately finished external cylindrical face, the said stationary member being built up around the said rotary member in such manner as to form a pressure chamber for receiving fluid under pressure between the said stationary and rotary members, an annular socket formed in the stationary member opposite the finished cylindrical face of the rotary member, a removable portion on the stationary member forming one wall of the socket, and an endless packing ring fitting in said socket with free lateral play therein, the inner cylindrical face of said ring being accurately machined so as to fit the said external cylindrical face of the rotary member.

9. In combination, a rotating vertical shaft loaded from below, a fluid operated bearing coöperating in supporting the shaft, said bearing including a rotary member and a stationary member, an endless packing ring between the said rotary and stationary members having free lateral play, and independent means for supplying fluid to the bearing.

10. The combination with a rotatable vertical shaft of a fluid operated bearing therefor comprising a stationary cup-shaped member, a member mounted therein and rotatable with the shaft, an endless packing ring interposed between the periphery of the rotating member and the stationary member and freely movable laterally, and means for introducing fluid under pressure to said bearing.

In testimony whereof, I have hereunto set my hand at Los Angeles, county of Los Angeles, State of California, this 17th day of August, 1916.

JOHN A. WINTROATH.